Oct. 15, 1963

D. H. GARRIOTT 3,106,731

DEVICE FOR WASHING TOMATOES AND THE LIKE

Filed Nov. 2, 1962

INVENTOR.
DONALD H. GARRIOTT
BY Pearce & Schaeperklaus
Attorneys

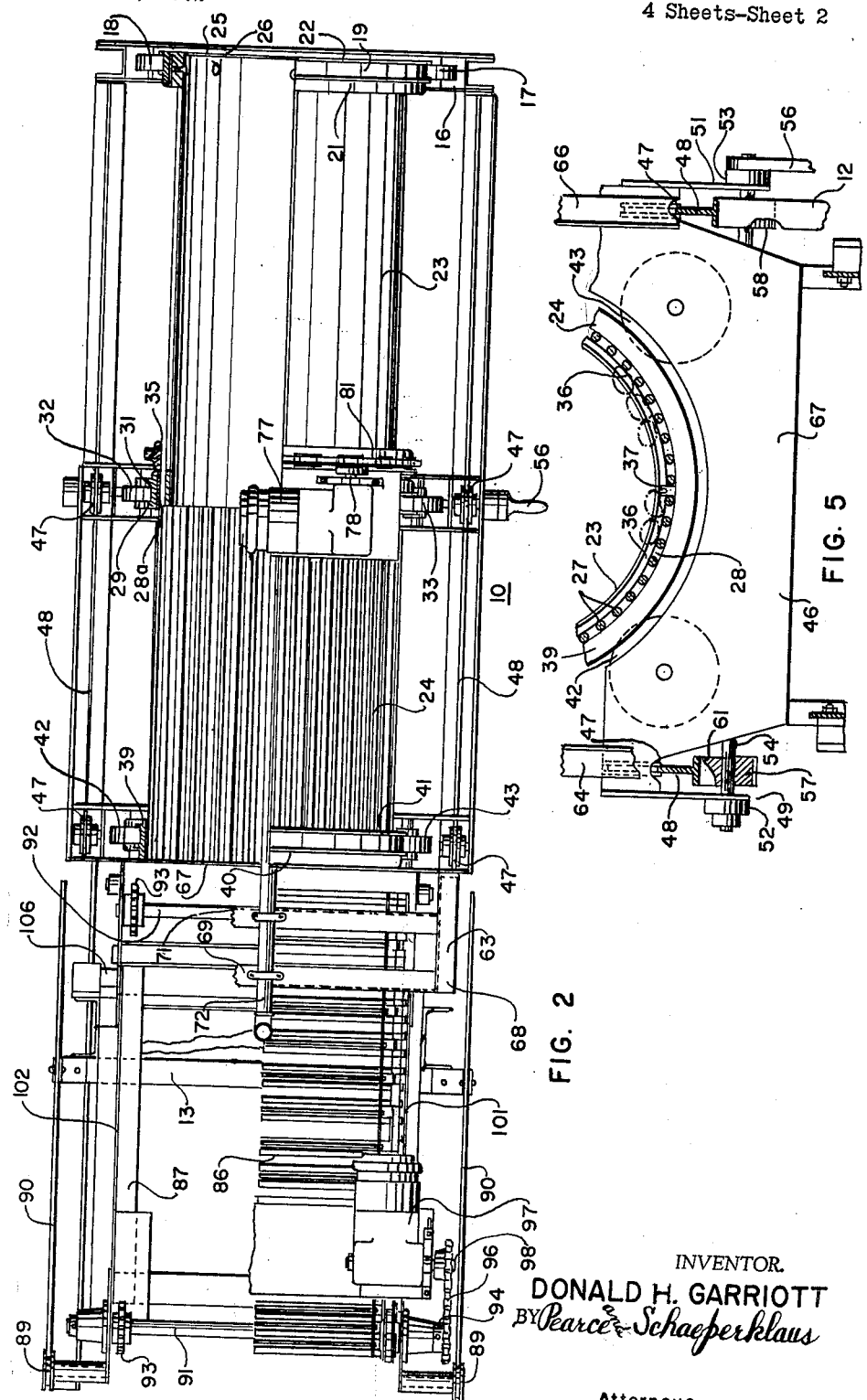

Oct. 15, 1963  D. H. GARRIOTT  3,106,731
DEVICE FOR WASHING TOMATOES AND THE LIKE
Filed Nov. 2, 1962  4 Sheets-Sheet 3
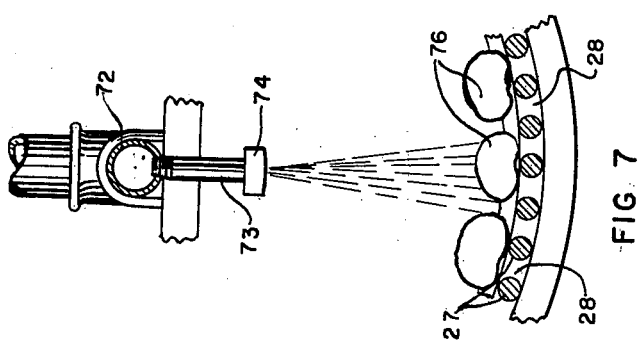
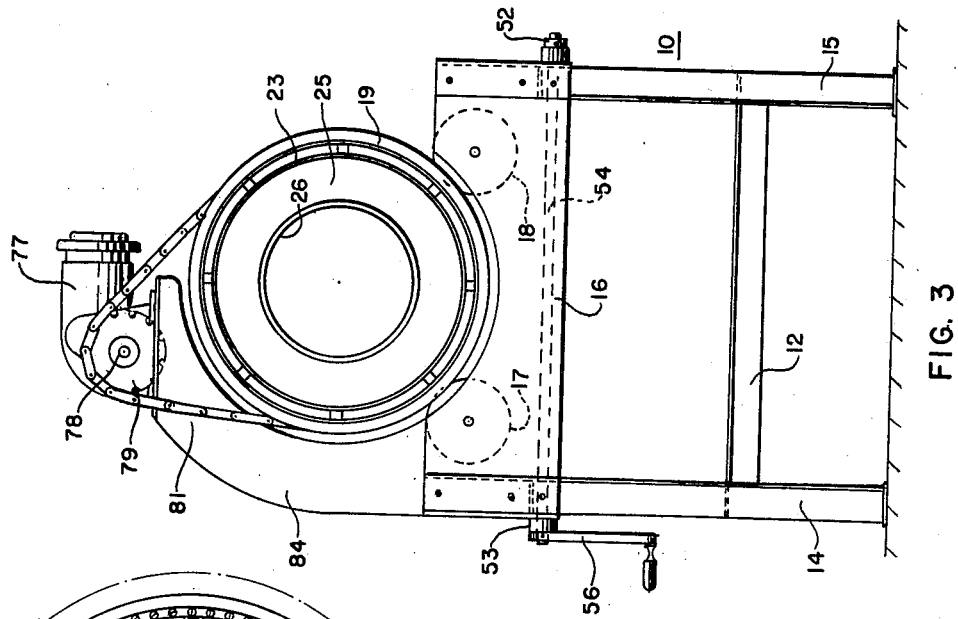
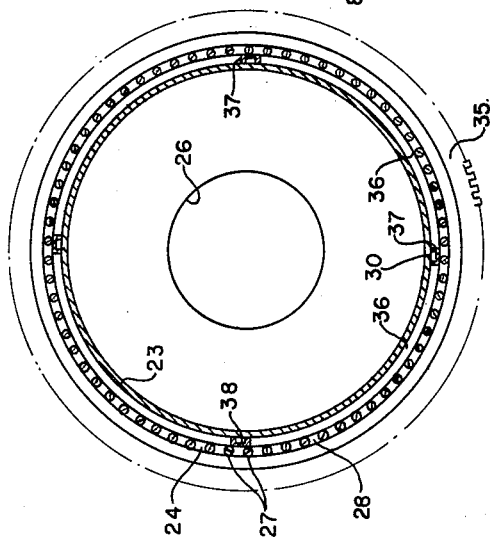
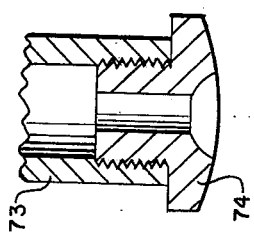
INVENTOR.
DONALD H GARRIOTT
BY Pearce & Schaeperklaus
Attorneys INVENTOR.
DONALD H. GARRIOTT
BY Pearce & Schaeperklaus
Attorneys

United States Patent Office 3,106,731
Patented Oct. 15, 1963

3,106,731
DEVICE FOR WASHING TOMATOES AND THE LIKE
Donald H. Garriott, Scottsburg, Ind., assignor to Morgan Packing Company, Inc., Austin, Ind., a corporation of Indiana
Filed Nov. 2, 1962, Ser. No. 234,949
4 Claims. (Cl. 15—3.13)

This invention relates to a device for washing produce such as tomatoes and the like.

In the handling of tomatoes and the like, it is necessary that the tomatoes be washed before being used. In addition, portions of the tomatoes which may be soft and of undesirable consistency must be removed. An object of this invention is to provide a device which automatically washes tomatoes or the like with a stream of water of sufficient force to remove portions of excess softness and improper consistency.

A further object of this invention is to provide a device of this type having a cage section in which the tomatoes or the like are supported while being washed so that unwanted unduly soft portions can be discharged through openings in the cage section.

A further object of this invention is to provide a device for washing tomatoes and the like of this type having a first cylindrical section and a second cage-like section in which the cage-like section telescopes over the outer surface of the cylindrical portion and can be moved to any selected position therealong to permit washing away of selected amounts of the tomatoes or the like.

A further object of this invention is to provide such a device in which the cylindrical section and the cage section are supported to rotate together as tomatoes or the like pass therethrough.

The above and other objects and features of the invention will be apparent to those skilled in the art to which this invention pertains from the following detailed description and the drawings, in which:

FIG. 2 is a plan view of the machine illustrated in FIG. 1, parts being broken away to reveal details of construction;

FIG. 3 is a view in end elevation of the device illustrated in FIGS. 1 and 2 looking in the direction of the arrows 3—3 in FIG. 1;

FIG. 5 is an enlarged fragmentary view in transverse section showing a portion of a carriage which supports the cage, a fragmentary portion of the cage being shown in association therewith;

FIG. 6 is a view in transverse section taking along the line 6—6 in FIG. 4;

FIG. 7 is an enlarged fragmentary view in transverse section taken on the line 7—7 in FIG. 1;

FIG. 8 is an enlarged fragmentary view in section of one of the nozzles of the device shown in association with a portion of a pipe supporting the nozzle.

In the following detailed description and the drawings, like reference characters indicate like parts.

Figure 1:
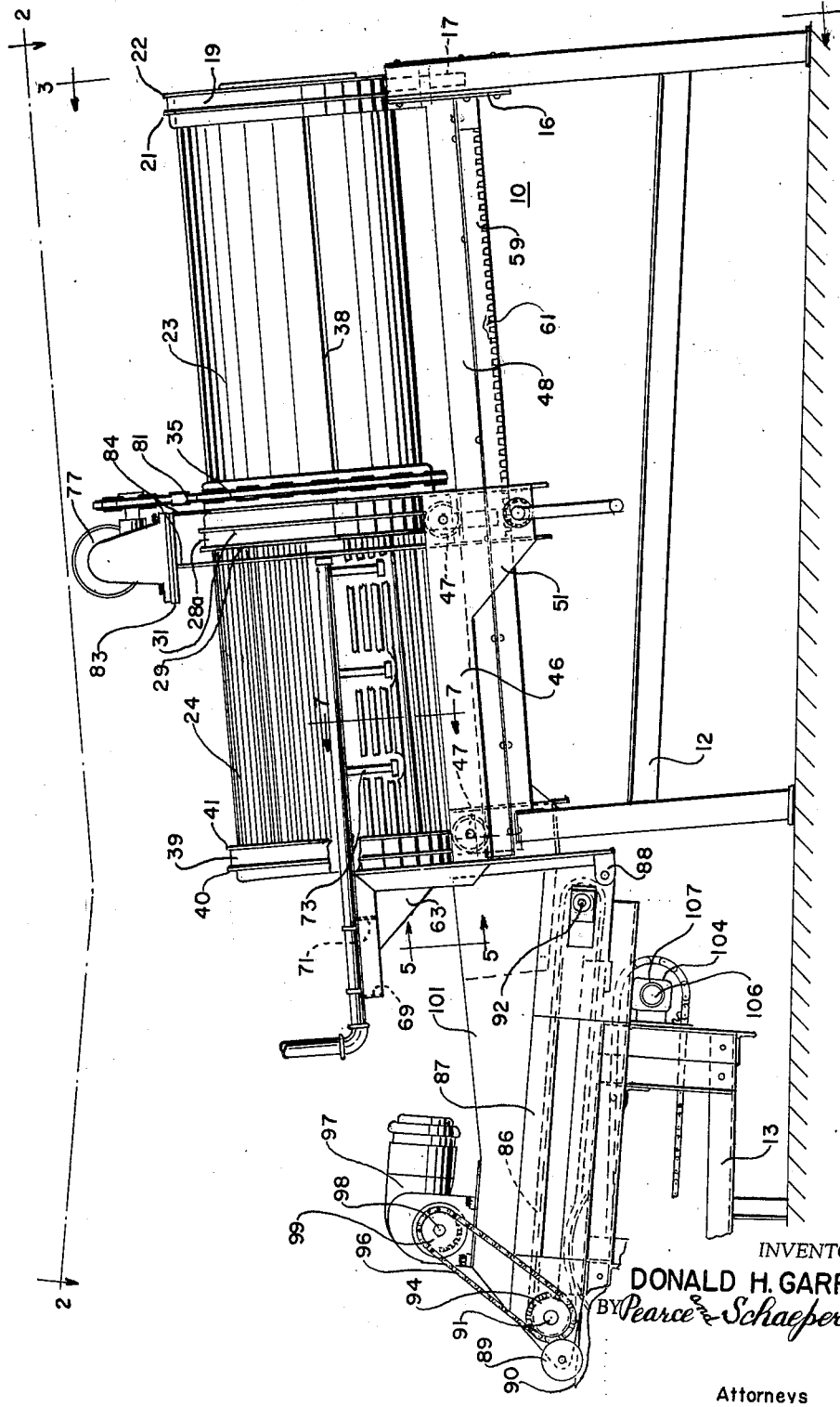
FIG. 1 is a view in side elevation showing a tomato washing machine constructed in accordance with an embodiment of this invention, a portion of a cage thereof being broken away to reveal interior construction, the machine being shown in extended position.
Figure 4:
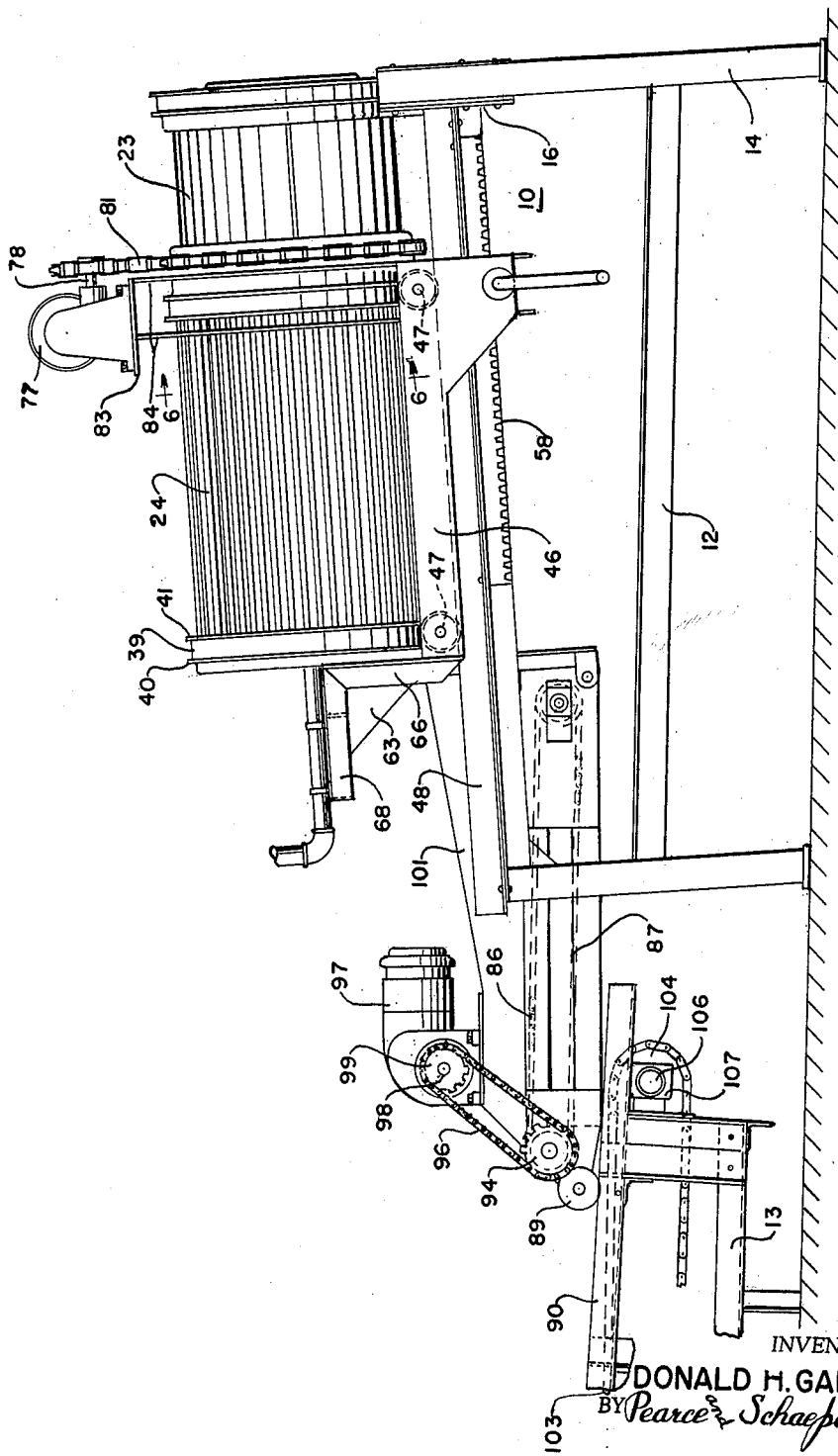
FIG. 4 is a view in side elevation of the machine illustrated in FIGS. 1 to 3 in a partly telescoped position.

In FIGS. 1 to 4, inclusive, is illustrated a tomato washing machine 10 constructed in accordance with an embodiment of this invention. The machine 10 includes a main frame 12 (FIGS. 1, 3 and 4) and a conveyor frame 13 (FIGS. 1 and 4). The main frame 12 includes upright legs 14 and 15 (FIG. 3) on which a transverse stationary wheel housing 16 (FIG. 3) is mounted. The housing 16 rotatably supports rollers 17 and 18 on which a ring member 19 is mounted for rotation. The ring member 19 includes outwardly extending annular flanges 21 and 22 which fit on opposite sides of the rollers 17 and 18 as indicated most clearly in FIG. 1. The ring member 19 is mounted on and embraces one end of a hollow cylindrical drum 23. The drum 23 slopes downwardly and to the left, as shown in FIG. 1, and the lower end of the drum 23 is telescopically received inside a cage member 24 as shown most clearly in FIG. 6. An annular plate 25 (FIGS. 2 and 3) having a central opening 26 partially closes the upper end of the drum 23 to prevent loss thereon of tomatoes and the like loaded into the drum.

The cage 24 includes a plurality of parallel elongated rods 27 (FIGS. 5, 6 and 7) arranged in a cylindrical shape and equally spaced circumferentially to form a plurality of elongated slots 28 (FIGS. 5 and 7) therebetween. Upper ends of the rods 27 are mounted inside a ring or band 28a (FIGS. 1 and 2). The ring 28a carries outwardly extending spaced flanges 29 and 31 which extend on opposite sides of rollers 32 and 33, as shown in FIG. 2. As will be explained in greater detail hereinafter, the rollers 32 and 33 support the upper end of the cage member 24. A sprocket wheel 35 is also mounted on upper ends of the rods as shown most clearly in FIG. 2. Inside the upper ends of the rods 27 are mounted segments 36 (FIG. 5), ends of which are spaced, as shown in FIG. 6, to form slots 37. The slots 37 receive key bars 38. The key bars 38 are mounted on the outer face of the drum 23 and cause the drum 23 and the cage 24 to turn together. Lower ends of the rods 27 are mounted inside a ring 39 (FIGS. 1 and 5). The ring 39 is provided with outwardly projecting flanges 40 and 41 (FIG. 1) which fit on opposite sides of rollers 42 and 43 (FIG. 2). The rollers 42 and 43 rotatably support the lower end of the cage 24.

The rollers 32, 33, 42 and 43 are mounted in a carriage 46. The carriage 46 is mounted on flanged rollers 47 (FIGS. 1, 2 and 5) which run on tracks 48 which, in turn, are mounted on the main frame 12.

Downwardly extending flanges 49 and 51 (FIG. 5) on the carriage 46 support bearings 52 and 53, respectively, in which a cross-shaft 54 is rotatably mounted. A crank 56 mounted on the cross-shaft 54 can be used for turning the cross-shaft 54. The shaft 54 carries gears 57 and 58 (FIG. 5) which mesh with racks 59 and 61 (FIG. 1) so that, when the crank 56 is turned, the carriage 46 and the cage 24 are moved to the right or left along the main frame as shown in FIGS. 1 and 4.

A spray head supporting framework 63 is mounted on the carriage and moves therewith. The framework 63 includes upright bars 64 and 66 which are mounted on a plate 67 of the carriage (see FIG. 5). The upright bars 64 and 66 carry lengthwise arms 68 (FIG. 4) on which transverse bars 69 and 71 (FIG. 2) are mounted. As shown in FIG. 2, a header pipe 72 is mounted on the transverse bars 69 and 71. A plurality of short lengths of pipe 73 are mounted in the header pipe 72 as shown in FIGS. 1 and 7. Nozzles 74 (FIG. 8) are mounted in the short lengths of pipe 73 and are directed downwardly as shown in FIG. 7, so that tomatoes 76 supported on the rods 27 of the cage can be sprayed with water from the nozzles 74.

As the tomatoes progress along the drum 23 and the cage 24, in a leftwise direction, as shown in FIG. 1, the drum 23 and the cage 24 are turned by operation of a motor 77. The motor 77 drives gearing, not shown, which drives a shaft 78 (FIG. 3). A sprocket wheel 79 mounted on the shaft 78 drives a chain 81. The chain 81, in turn, runs on and drives the sprocket 35 (FIG. 1) which is mounted on the cage 24. The motor 77 is mounted on a platform 83 which is supported on upwardly extending arms 84 which are a part of the carriage 46.

Tomatoes in the cage 24 are discharged at the lower end of the cage 24 onto a moving conveyor 86. The conveyor 86 includes a frame 87. One end of the frame 87 is hinged to the carriage 46 by a hinge 88. The opposite end of the frame 87 is supported on rollers 89. The rollers 89 run on tracks 90 which are supported on the conveyor frame 13. Shafts 91 and 92 journaled on the frame 87 support sprocket wheels 93 on which the conveyor 86 runs. The shaft 91 also carries a sprocket 94 on which a drive chain 96 runs. The drive chain 96 is driven by a motor 97 having a shaft 98 on which is mounted sprocket 99. The drive chain 96 runs on the sprocket 99 and is driven thereby. Side walls 101 (FIG. 1) and 102 (FIG. 2) of the frame 87 guide the tomatoes as the tomatoes fall from the cage 24 to guide the tomatoes onto the conveyor 86.

From the conveyor 86, the tomatoes can fall onto a discharge conveyor 103, only a portion of which is shown. The conveyor 103 runs on sprockets 104 (FIGS. 1 and 4) which are mounted on a shaft 106. The shaft 106 is rotatably mounted in bearings 107 which are carried by the conveyor frame 13.

Tomatoes are loaded into the drum 23 through the opening 26 (FIG. 3) and progress along the drum 23 to the left as shown in FIGS. 1 and 4 as the drum 23 and the cage 24 are turned and enter the cage 24 after leaving the lower end of the drum 23. Water from the nozzles 74 is sprayed against the tomatoes to wash dirt therefrom and to wash excessively soft portions of the tomatoes through the slots 28 between the rods 27. The carriage 46 and the cage 24 are moved to the right or left as shown in FIGS. 1 and 4 to such a position along the frame 12 that such portions of the tomatoes as are undesirably soft can be washed away between the rods 27 while there is no excessive loss of firm tomatoes. When the tomatoes have been washed and have progressed along the cage to the lower end thereof, the tomatoes fall onto the moving conveyor 86 which directs the tomatoes onto the discharge conveyor 103.

The tomato washing machine illustrated in the drawings described above is subject to structural modification without departing from the spirit and scope of the appended claims.

Having described my invention, what I claim as new and desire to secure by Letters Patent is:

1. A device for washing produce which comprises a main frame, a carriage mounted on said frame for moving therealong, a cylindrical cage member rotatably mounted on the carriage, a cylindrical drum member having one end portion telescopically received inside the cage member, means on the main frame for rotatably supporting an opposite end portion of the drum member, a spray nozzle mounted on the carriage and extending inside the cage member for spraying liquid under pressure against produce supported inside the cage, there being slots in the cage for discharge of the fluid and excessively soft portions of the produce, means for rotating the drum member and the cage member together, the cage member and the drum member sloping from the drum member to the cage member, whereby produce in the drum member progresses therealong and into and along the cage member, means for moving the carriage along the main frame so that a predetermined length of the cage member is exposed free of the drum member, and means for receiving produce discharged from the cage member.

2. A device for washing produce which comprises a main frame, a carriage mounted on said frame for moving therealong, a cylindrical cage member rotatably mounted on the carriage, a cylindrical drum member having one end portion telescopically received inside the cage member, means on the main frame for rotatably supporting an opposite end portion of the drum member, a spray nozzle mounted on the carriage and extending inside the cage member for spraying liquid under pressure against produce supported inside the cage, there being slots in the cage for discharge of the fluid and excessively soft portions of the produce, means for rotating the drum member and the cage member together, the cage member and the drum member sloping from the drum member to the cage member, whereby produce in the drum member progresses therealong and into and along the cage member, means for moving the carriage along the main frame so that a predetermined length of the cage member is exposed free of the drum member, a conveyor frame attached to the carriage, and a conveyor mounted on said conveyor frame and receiving produce discharged from the cage member.

3. A device for washing produce which comprises a frame, a carriage mounted on said frame for moving therealong, a cylindrical drum member and a cylindrical cage member telescopically and rotatably mounted on the frame, one of said members being supported on the carriage, a spray nozzle mounted inside the cage for spraying liquid under pressure against produce supported inside the cage, there being slots in the cage for discharge of the fluid and excessively soft portions of the produce, means for rotating the drum member and the cage member together, the cage member and the drum member sloping from the drum member to the cage member, whereby produce in the drum member progresses therealong and into and along the cage member, means for telescopically moving the members so that a predetermined length of the cage member is exposed free of the drum member, and means for receiving produce discharged from the cage member.

4. A device for washing tomatoes which comprises a frame, a carriage mounted on said frame for moving therealong, a cylindrical cage member, said cage member comprising a plurality of parallel rods arranged cylindrically and spaced circumferentially and rings overlying and linking end portions of the rods, the ring members having outwardly facing tracks, there being rollers rotatably mounted on the carriage, the tracks of the rings running on the rollers to rotatably support the cage member, a cylindrical drum member having one end portion telescopically received inside the cage member, means on the frame for rotatably supporting an opposite end portion of the drum member, a spray nozzle mounted inside the cage member for spraying liquid under pressure against tomatoes supported on the rods inside the cage, there being slots in the cage between the rods for discharge of the fluid and excessively soft portions of the tomatoes, means for rotating the drum member and the cage member together, the cage member and the drum member sloping from the drum member to the cage member whereby produce in the drum member progresses therealong and into and along the cage member, means for telescopically moving the members so that a predetermined length of the cage member is exposed free of the drum member, and means for receiving produce discharged from the cage member.

References Cited in the file of this patent

UNITED STATES PATENTS

| | | |
|---|---|---|
| 1,132,597 | Marlin | Mar. 23, 1915 |
| 1,457,284 | Sells | May 29, 1923 |
| 1,912,414 | Tobey | June 6, 1933 |
| 2,037,266 | Ranney | Apr. 14, 1936 |
| 2,308,775 | Olson | Jan. 19, 1943 |